United States Patent
Colliau

[15] 3,679,234
[45] July 25, 1972

[54] REFLECTIVE PLASTIC COATED TRAILER HITCH BALL

[72] Inventor: Frank Colliau, 7565 W. Huron River Drive, Dexter, Mich. 48130

[22] Filed: Sept. 17, 1969

[21] Appl. No.: 858,648

[52] U.S. Cl..................280/511, 117/35 R, 117/132 CB, 161/4, 161/16, 161/217, 264/24, 287/90 R, 308/238
[51] Int. Cl..................B60d 1/06, F16c 11/06, F16c 33/32
[58] Field of Search..................280/511; 308/238; 161/4, 7, 161/16, 217; 117/132 CB, 35 R, 35 S; 287/90 R; 264/21

[56] References Cited

UNITED STATES PATENTS

| | | | |
|---|---|---|---|
| 3,434,741 | 3/1969 | Grant | 280/511 X |
| 3,473,826 | 10/1969 | Elliot et al. | 280/511 X |
| 3,549,173 | 12/1970 | Stanfield | 280/511 X |
| 3,567,504 | 3/1971 | Hopkins et al. | 308/238 X |
| 3,582,157 | 6/1971 | Hammon | 308/238 X |
| 3,536,367 | 10/1970 | Papish | 308/238 |
| 3,542,400 | 11/1970 | Mason | 280/511 X |
| 3,552,815 | 1/1971 | Keller | 308/238 |
| 3,574,429 | 4/1971 | Reising | 308/238 |
| 2,241,365 | 5/1941 | Meyer | 161/4 X |
| 2,297,182 | 9/1942 | Weiss | 280/511 |
| 2,714,912 | 8/1955 | Gonnella | 280/511 X |
| 2,878,047 | 3/1959 | Booth | 287/90 |
| 3,080,267 | 3/1963 | Schmalz | 161/190 X |
| 3,225,123 | 12/1965 | Wiswell | 264/21 X |
| 3,436,101 | 4/1969 | Hanson | 280/511 |
| 3,456,043 | 7/1969 | Emery | 264/21 |

FOREIGN PATENTS OR APPLICATIONS 757,582   9/1956   Great Britain

*Primary Examiner*—Harold Ansher
*Attorney*—Farley, Forster and Farley

[57] ABSTRACT

A trailer hitch ball encased in a molded reflective and friction reducing plastic covering to provide a quieter, longer wearing and more pleasing appearance.

3 Claims, 1 Drawing Figure

PATENTED JUL 25 1972 3,679,234
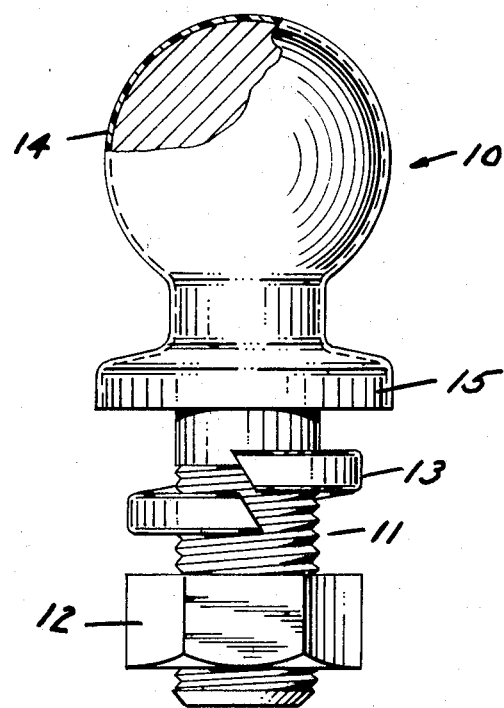
INVENTOR
BY FRANK COLLIAU
Farley, Forster & Farley
ATTORNEY

REFLECTIVE PLASTIC COATED TRAILER HITCH BALL

BACKGROUND OF THE INVENTION

Long in use trailer hitch balls have been plated with nickel or chrome to improve their appearance and offer protection from rust. HOwever, the trailer socket usually wears off the plating and rusting occurs unless the ball is kept greased both in use and when not in use. A greased ball is also unsightly and poses a danger to clothing when persons approach the vehicle to open the trunk. Sometimes tennis balls with an opening cut away or frozen orange juice cans with one end removed are used to cover the ball; however, the result often remains unsightly.

SUMMARY OF THE INVENTION

The trailer hitch ball is permanently covered with a molded rigid plastic that has a relatively friction-free surface but bonds well with the steel ball. The plastic utilized has a sufficient compressive strength and low co-efficient of friction to provide a quieter and longer lasting ball that remains sightly. A reflective filler is used in the plastic to provide a bright glow when a following vehicle's headlights light up the ball.

DESCRIPTION OF THE DRAWINGS

The FIGURE is a side elevation of a coated trailer hitch ball partially cut away to indicate the plastic coating.

DESCRIPTION OF THE PREFERRED EMBODIMENT

A trailer hitch ball 10 is shown in the figure and includes a threaded stub 11, nut 12 and lock washer 13 for attachment to a trailer hitch. As shown the plastic coating 14 covers the ball and upper portion of the shoulder 15. Although various low friction plastics such as tetrafluoroethylene may be used, the most satisfactory plastic that meets the compressive strength, low friction and colorability requirements is (ABS) acrylonitrile butadiene styrene. The plastic coating is applied by pressure molding in a die with the plastic containing a reflective pigment as a filler.

I claim:

1. A trailer hitch ball characterized by a low friction rigid plastic coating pressure molded about at least the ball portion for tight adherence thereto and of sufficient compressive strength to provide a quieter and longer lasting ball that remains sightly.

2. The trailer hitch ball of claim 1 wherein said plastic is substantially acrylonitrile butadiene styrene.

3. The trailer hitch ball of claim 1 wherein said plastic coating includes a reflective coloring as a filler.

* * * * *